March 31, 1970  P. OLLAGNON  3,503,362
AUTOMATIC WARNING DEVICE ESPECIALLY APPLICABLE
FOR CONSTANT DEFLECTION TORQUE WRENCHES
Filed Jan. 23, 1968  2 Sheets-Sheet 1
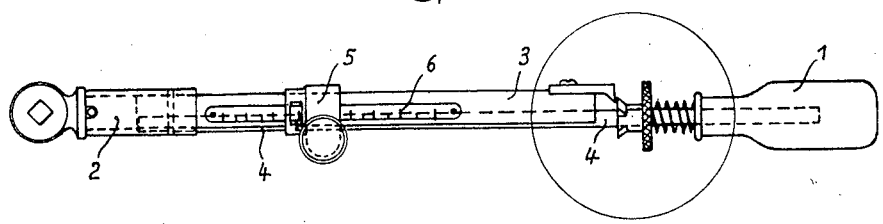
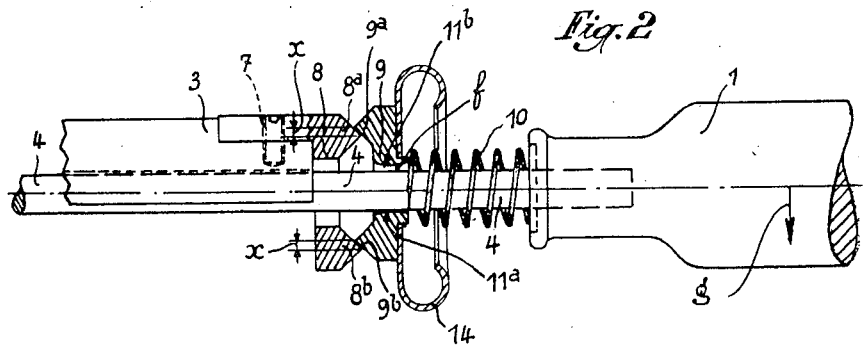
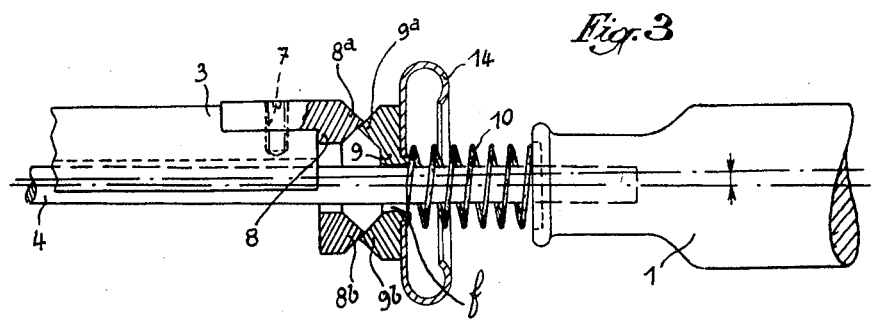

March 31, 1970     P. OLLAGNON     3,503,362
AUTOMATIC WARNING DEVICE ESPECIALLY APPLICABLE
FOR CONSTANT DEFLECTION TORQUE WRENCHES
Filed Jan. 23, 1968     2 Sheets-Sheet 2
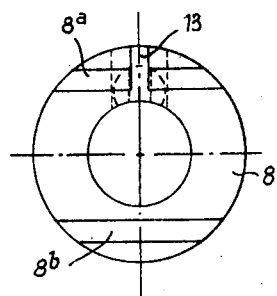
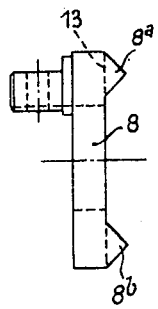
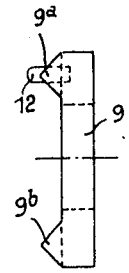
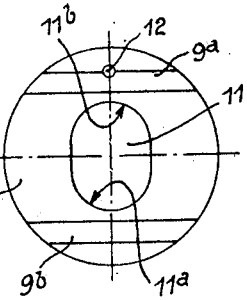
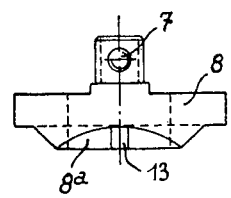
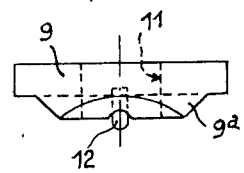
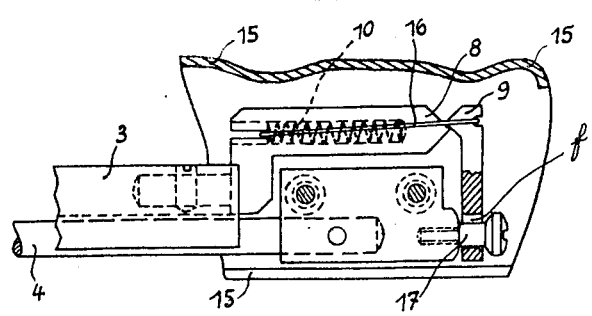
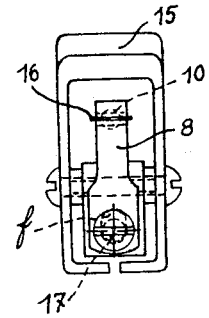

United States Patent Office 3,503,362
Patented Mar. 31, 1970

3,503,362
AUTOMATIC WARNING DEVICE ESPECIALLY APPLICABLE FOR CONSTANT DEFLECTION TORQUE WRENCHES
Paul Ollagnon, Saint-Etienne, France, assignor to Forges Stephanoises, Saint-Etienne, Loire, France
Filed Jan. 23, 1968, Ser. No. 699,868
Claims priority, application France, Feb. 2, 1967, 9,634
Int. Cl. G08b 3/00
U.S. Cl. 116—67                            13 Claims

ABSTRACT OF THE DISCLOSURE

An automatic warning device, particularly for constant deflection torque wrenches, comprises two opposed knife-edges of V-shaped section each forming a double ramp. One knife-edge is firmly attachable to the rigid body of the wrench; the other is couplable to its flexible stem. A spring urges the knife-edges together and the separation between the crests of the knife-edges corresponds to the constant deflection of the wrench. The coupling of the second knife-edge to the stem has a play less in value than said deflection, resulting in a sharp noise on the stem as the crests cross on tightening the wrench and enabling the device to reset itself automatically by the return of the stem to its resting position. Each knife edge may comprise a single V-shaped section or two V-shaped sections at 180°. Each knife-edge may form an angle of 90° to form a double 45° ramp. A resonance box intensifies the noise and may be the hollow handle of the wrench.

---

The present invention relates to automatic warning devices especially applicable to constant deflection torque wrenches.

Constant deflection torque wrenches are constituted, essentially, by a rigid body to which is coupled a flexible stem provided with a handle. The flexible length of the stem is adjustable by a sort of sliding sight which can be displaced along a graduated rule arranged on the rigid body. Thus, a constant measured deflection between the free end of the rigid body and the flexible stem determines various degrees of tightening.

This type of wrench comprises generally a warning device which informs the operator when the constant deflection, that is to say the desired degree of tightening, is attained. This warning device, of which the operation is not automatic, is constituted by a sort of ring comprising a partial flange sliding on the flexible stem and urged by a spring against a retaining knife-edge rigidly fixed to the rigid body. When the desired deflection is attained, the edge of the flange escapes from the retention of the knife-edge and causes the fall of the ring. This warning device must be re-set after each tightening and this resetting necessitates: partial rotation of the ring, the backward traction of the latter and another partial rotation of the said ring.

It is an object of the warning device according to the present invention to eliminate this three-fold resetting operation.

It is a further object to insure automatic resetting by the return itself of the flexible stem to its resting position.

According to the present invention, an automatic warning device, particularly applicable to constant deflection torque wrenches having a rigid body and a flexible stem, comprises a combination of two opposed knife-edges of V-shaped section each forming a double ramp, one of said knife-edges being firmly attachable to the rigid body of the wrench, and the other knife-edge being couplable to the flexible stem and located opposite the first knife-edge against which it is supported under the action of a spring, so that the distance between the crests of the specified V-shaped sections of said knife-edges corresponds to the constant deflection of the wrench, the specified coupling of this second knife-edge to the flexible stem having a clearance of lower value than that of the constant deflection of the wrench and thus producing, under the action of said spring a sharp noise on the said flexible stem when the crests of the said knife-edges cross at the time of the act of tightening the wrench, the specified clearance enabling automatic resetting by the return of the flexible stem to its resting position.

Each knife edge may comprise only a single V-shaped section or even two of such sections located at 180° from one another.

This or these V-shaped sections of each knife-edge advantageously make an angle of 90° to form a double ramp at 45°.

The noise caused by the disengagement is, preferably, intensified by a resonance box.

In order that the invention may be more fully understood several embodiments thereof are described below purely by way of illustrative but non-limiting examples, with reference to the accompanying drawings in which:

FIGURE 1 shows a complete constant deflection torque wrench of known type with a conventional non-automatic disengagement system and resetting warning device;

FIGURES 2 and 3 show, on a larger scale and in longitudinal section only, the part of a wrench bearing an automatic warning device according to one embodiment of the present invention, before and after disengagement respectively;

FIGURE 4 is a front view of the knife-edge element rigidly attached to the rigid body of the wrench in FIGURES 2 and 3;

FIGURE 5 shows a side elevation of the element of FIGURE 4;

FIGURE 6 shows a plan view from above of the element of FIGURE 4;

FIGURES 7, 8 and 9 show three views, respectively analogous to those of FIGURES 4, 5 and 6, of the knife-edge element which is coupled to the flexible stem of the wrench in FIGURES 2 and 3;

FIGURE 10 shows another embodiment of an automatic warning device according to the invention; and FIGURE 11 shows an end view of the embodiment of FIGURE 10.

Referring now to the drawings, as indicated above, FIGURE 1 shows a constant deflection torque wrench of conventional type, with its handle 1, its tip 2, its rigid body 3, its flexible stem 4, its sliding sight 5, with its locking screw and its scale 6. In FIGURE 1, the part enclosed in the large circle shows the non-automatic disengagement device, the whole of this wrench being known and being shown only for the sole purpose of providing the background to the invention.

In the embodiment of the device according to the invention, shown in FIGURES 2 to 9, at the free end of the rigid body 3 of the wrench is fixed, such as by screwing at 7, a circular part 8 forming, on both sides of the flexible stem 4, which passes freely there-through, two symmetrical V-shaped right-angled knife-edges 8a and 8b, perpendicular to the plane of the flexion of this stem and without impeding the said flexion.

Opposite the two knife-edges 8a and 8b are two other knife-edges 9a and 9b of a circular part 9, these knife-edges 9a and 9b having the same separation as those 8a and 8b and being equal to them, but reversed. Part 9 which bears these knife-edges 9a and 9b can slide on the flexible stem 4 and it is urged against the part 8 by a spring 10.

When the wrench is in the resting position (FIG. 2), the knife-edges 9a and 9b are displaced transversally with respect to the knife-edges 8a and 8b, on the side of the rigid body 3, by a distance x equal to the constant deflection of the wrench, and the lower sides of the knife-edges 9a and 9b are supported, forming sliding ramps, on the upper sides of the knife-edges 8a and 8b.

This displacement is adjusted by construction by the fact of the location and of the contour of the bore 11 (FIG. 7) formed in the part 9 to provide passage for the flexible stem 4. Under the thrust of the spring 10, it is, in fact, the lower portion 11a of this bore which, being urged against the stem 4, determines this displacement (FIG. 2).

On the other hand, part 9 can slide transversally on the stem 4, not through a cylindrical bore but through the oblong aperture 11 (FIG. 7) in the direction 9b, 9a, so there exists a certain clearance f above the flexible stem 4, on the side of the rigid body 3 when the wrench is in resting position (FIG. 2), this clearance being, by construction, less than the constant deflection of the wrench.

To prevent the part 9 from turning with respect to part 8, this part 9 comprises a finger 12 which is captive, but can move radially, in a groove 13 of the part 8.

Moreover, the part 9 is coupled to a resonance box 14.

The operation of this warning device is extremely simple and is as follows:

When the user operates the handle 1 in the direction of the arrow g (FIG. 2), the stem 4 deflects thereby turning the part 9 which, through the effect of the ramps 9a, 8a and 9b, 8b, compresses the spring 10. When the points or crests of the knife-edges cross, the spring 10 extends causing the knife-edges to cross to their inverse surfaces (FIG 3) while, through the effect of the clearance (which may also be termed play or lost motion) f, the part 9 comes into abutment against the flexible stem 4 through the part 11b of its oblong aperture 11, which produces a sharp noise considerably amplified by the resonance box 14. This noise warns the operator that he has to discontinue his effort.

Consequently, the clearance f having been transferred to below the flexible stem 4 (FIG. 3), the return of this stem to its initial position restores the part 9 to its point of departure (FIG. 2), which is easily understood since the specified clearance f is less than the constant deflection x. The device is thus reset by itself.

In the simplified embodiment shown in FIGS. 10 and 11, the movable knife-edge 9 is mounted to oscillate in the extension of the flexible stem 4 in the interior of a hollow handle 15 forming a resonance box. The spring 10 is placed in the interior of the part constituting the fixed knife-edge 8 and acts on the movable knife-edge 9 through a steel wire stirrup 16. The clearance of disengagement and of resetting f is produced by a screw 17 located in the extension of the flexible stem 4. The operation of this embodiment is identical with that of the embodiment shown in FIGS. 2 and 3.

Finally, as goes without saying, and as is already apparent besides from that which precedes, the invention is not limited in any way to the specific embodiments described above, but various changes and modifications may be made therein without departing from the essential concept as defined in scope by the appended claims.

Thus, for instance, the spring 10, instead of being a spring under compression, may be replaced by spring-means under tension, arranged to urge the opposed knife-edges together.

I claim:

1. In a tool characterized by a constant deflection and including a rigid body and a flexible stem having an original position of rest relative to said rigid body, an automatic warning device comprising two opposed knife-edges of V-shaped section each having a crest and forming a double ramp, one of said knife-edges being firmly attachable to the rigid body, and the other being adapted for being coupled to the flexible stem and located opposite the first said knife-edge, a spring urging one said knife-edge against the other said knife-edge so that the distance between the crests of the V-shaped sections of said knife-edges corresponds to the constant deflection of the tool, and means for coupling the second said knife-edge to the flexible stem with a lost motion of lower value than that of the constant deflection of the tool whereby there is produced, under the action of said spring, a sharp noise on the said flexible stem when the crests of the said knife-edges cross during operation of said tool, said lost motion enabling automatic resetting of the knife-edges relative to each other by the return of the flexible stem to its original position of rest.

2. An automatic warning device according to claim 1, wherein each knife-edge comprises a single V-shaped section.

3. An automatic warning device according to claim 1, wherein each knife-edge comprises two V-shaped sections situated on a circle and at 180° from one another.

4. An automatic warning device according to claim 1, wherein the V-shaped section of each knife-edge forms an angle of 90° to form a double ramp at 45°.

5. An automatic warning device according to claim 1, including a resonance box juxtaposed to said knife-edges whereby the noise is intensified.

6. An automatic warning device according to claim 2, wherein the V-shaped section of each knife-edge forms an angle of 90° to form a double ramp at 45°.

7. An automatic warning device according to claim 3, wherein the V-shaped section of each knife-edge forms an angle of 90° to form a double ramp at 45°.

8. An automatic warning device according to claim 2, including a resonance box juxtaposed to said knife-edges whereby said noise is intensified.

9. An automatic warning device according to claim 3, including a resonance box juxtaposed to said knife-edges whereby said noise is intensified.

10. A device as claimed in claim 1 comprising a ring on which said other knife-edge is supported, said ring having an opening through which the flexible stem extends, the opening being oblong and the flexible stem being displaceable therein to provide said lost motion.

11. A device as claimed in claim 1 comprising a means supporting said other knife-edge on said flexible stem and including two parts connected with play corresponding to said lost motion.

12. A device as claimed in claim 1 wherein said spring is mounted on said flexible stem.

13. A device as claimed in claim 1 wherein said spring is mounted on one of said knife-edges.

References Cited

UNITED STATES PATENTS

| | | |
|---|---|---|
| 1,814,544 | 7/1931 | Cairncross et al. |
| 2,172,561 | 9/1939 | Krause _____ 81—52.4 |
| 2,268,081 | 12/1941 | Pagnard. |
| 3,018,677 | 1/1962 | Mutolo et al. _____ 81—52.4 |
| 3,366,187 | 1/1968 | Von Tersch _____ 81—52.3 XR |

LOUIS J. CAPOZI, Primary Examiner

U.S. Cl. X.R.

81—52.5, 58.3